United States Patent
Burchard et al.

(10) Patent No.: US 7,034,889 B2
(45) Date of Patent: Apr. 25, 2006

(54) SIGNAL PROCESSING UNIT AND METHOD FOR A DIGITAL TV SYSTEM WITH AN INCREASED FRAME RATE VIDEO SIGNAL

(75) Inventors: Bernd Burchard, Ottobrunn (DE); Ralf Schwendt, Ashheim (DE)

(73) Assignee: Infineon Technologies AG, Munich (DE)

( * ) Notice: Subject to any disclaimer, the term of this patent is extended or adjusted under 35 U.S.C. 154(b) by 718 days.

(21) Appl. No.: 09/894,815

(22) Filed: Jun. 28, 2001

(65) Prior Publication Data

US 2002/0044217 A1 Apr. 18, 2002

Related U.S. Application Data

(63) Continuation of application No. PCT/DE00/00037, filed on Jan. 4, 2000.

(30) Foreign Application Priority Data

Jan. 5, 1999 (DE) .................. 199 00 136

(51) Int. Cl.
*H04N 7/01* (2006.01)
*H04N 11/20* (2006.01)

(52) U.S. Cl. ............... 348/459; 348/715; 348/443; 348/448; 348/569

(58) Field of Classification Search ........... 348/459, 348/451, 452, 456, 443, 448, 569, 911, 715; 345/531, 545, 546, 547
See application file for complete search history.

(56) References Cited

U.S. PATENT DOCUMENTS

| | | | |
|---|---|---|---|
| 5,610,661 A * | 3/1997 | Bhatt ..................... 348/446 |
| 5,808,617 A | 9/1998 | Kenworthy et al. ....... 345/421 |
| 6,144,412 A * | 11/2000 | Hirano et al. ............ 348/441 |
| 6,147,712 A * | 11/2000 | Shimamoto et al. ....... 348/446 |
| 6,219,040 B1 * | 4/2001 | Kotha et al. ............. 345/211 |
| 6,222,589 B1 * | 4/2001 | Faroudja et al. ......... 348/448 |
| 6,243,140 B1 * | 6/2001 | Suzuki .................... 348/448 |
| 6,269,484 B1 * | 7/2001 | Simsic et al. ............ 725/151 |
| 6,370,198 B1 * | 4/2002 | Washino ................ 375/240.26 |
| 6,456,329 B1 * | 9/2002 | Tinker et al. ........... 348/448 |
| 6,456,340 B1 * | 9/2002 | Margulis ................ 348/745 |
| 6,549,240 B1 * | 4/2003 | Reitmeier ............... 348/459 |
| 6,580,452 B1 * | 6/2003 | Gangitano .............. 348/180 |
| 6,606,128 B1 * | 8/2003 | Hanafee et al. ......... 348/563 |
| 2004/0036708 A1 * | 2/2004 | Evanicky et al. ....... 345/691 |

FOREIGN PATENT DOCUMENTS

| | | |
|---|---|---|
| EP | 0 851 677 A1 | 12/1997 |
| JP | 5-260448 | 10/1993 |
| WO | WO 97/05598 | 7/1996 |
| WO | WO 98/07274 | 7/1997 |
| WO | WO-WO 98/56171 | 12/1998 |

* cited by examiner

*Primary Examiner*—John Miller
*Assistant Examiner*—Jean W. Désir
(74) *Attorney, Agent, or Firm*—Peter F. Corliss; George N. Chaclas; Edwards Angell Palmer & Dodge

(57) ABSTRACT

A signal processing unit for a digital TV system comprises a first device which acts on a video signal with graphical picture elements and text characters. A second device performs frame-rate conversion on the output of the first device. The output of the second device drives a display driver.

13 Claims, 2 Drawing Sheets

SIGNAL PROCESSING UNIT AND METHOD FOR A DIGITAL TV SYSTEM WITH AN INCREASED FRAME RATE VIDEO SIGNAL

RELATED APPLICATIONS

This Application is a continuation of International Application No. PCT/DE00/00037, filed Jan. 4, 2000, designating the United States, which claims priority to DE 199 00 136.7 filed Jan. 5, 1999.

The entire teachings of the above applications are incorporated herein by reference.

BACKGROUND OF THE INVENTION

The invention relates to a signal processing unit for a digital TV system.

Digital TV systems differ from the more familiar analog television systems by virtue of the almost exclusive digital processing and conditioning of the picture and sound signals that are transmitted or made available via various media such as satellite, cable, antenna, CD-ROM, DVD, etc. In general, these signals are digitally coded and compressed according to a specific standard (for example DVB-T or MPEG-2 or the like), and optionally encrypted. The systems of this type thus require complex signal processing which, in practice, can only be realized digitally.

SUMMARY OF THE INVENTION

The invention is based on developing a signal processing unit for a digital TV system in such a way that, with relatively little additional outlay, the frame rate can be increased in order to improve the picture impression.

In accordance with an embodiment of the present invention, a signal processing unit comprises a first device for acting on a video signal, for example, by overlaying graphical picture elements and text characters onto the video signal. A second device converts the frame-rate and picture-format of the signal after processing by the first device. The output of the second device is applied to a driver stage for driving a display.

Because frame-rate conversion occurs at the end of the processing chain and, consequently, after all graphics operations, graphics operations can be performed at the lower frame rate, such that the speed requirements of these circuits are not particularly stringent or do not have to be increased. Furthermore, only one circuit is required for frame-rate conversion, which processes the whole signal (that is to say, video picture data overlayed with graphics and/or text data).

Preferably, a common picture storage device is connected to the first and second devices for storing and sharing picture data, minimizing the need for additional components.

Furthermore, at least one input stage receives compressed picture data from at least one transmission medium. Also, at least one decoding unit converts the compressed picture data into digital pixel data of an overall data stream which is fed to the first device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
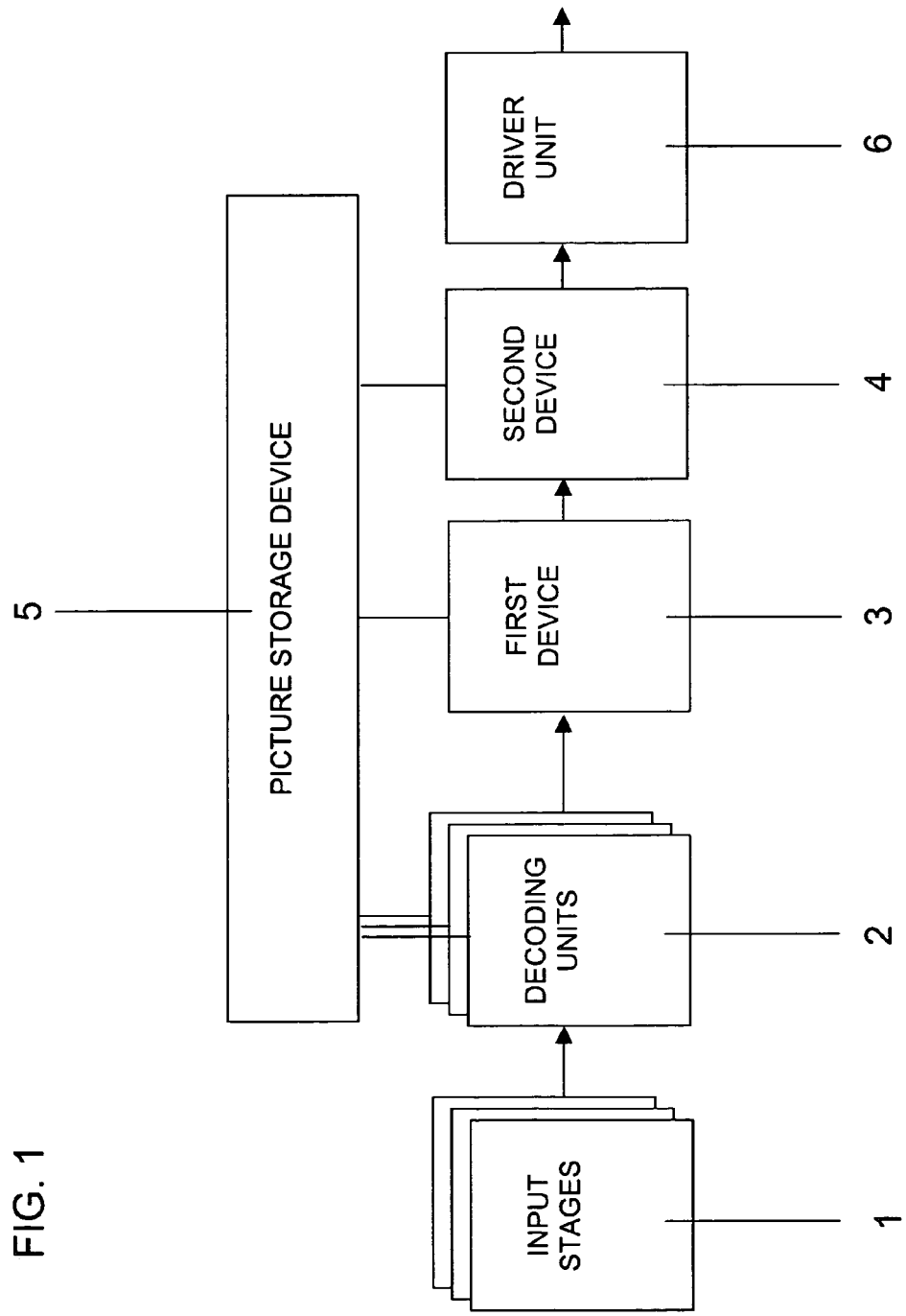
FIG. 1 is a block diagram showing the basic structure of an embodiment of the present invention.

In accordance with FIG. 1, a signal processing unit, according to the invention, for a digital TV system comprises a plurality of input stages 1 for TV data streams from different sources. This may involve corresponding tuners for reception via antenna, cable or satellite or other input stages for the connection of drives for CD-ROMs, DVDs, etc. In this case, the data streams may be modulated by known digital methods such as QPSK, QAM, COFDM, and optionally compressed using techniques such as MPEG-1, MPEG-2. New transmission standards such as DVB-T, etc., may also be realized.

The input stages 1 are followed by one or more decoding units 2. The decoder units 2 serve, for example, to convert compressed picture data into digital pixel data, and to combine the various individual data streams (picture and sound signal) to form an overall data stream. For this purpose, the decoding units 2 may comprise, for example, an MPEG-2 decoder and various audio signal decoders, e.g. for stereo, surround, etc.

The digital video signal (YUV signal) present at the output of the decoding units 2 is then fed to a first device 3. The first device 3 overlays graphical picture element and text character signals onto the digital video signal. Such processing may involve, for example, Internet browsers or other graphical user interfaces via which interactive communication of the user via a telephone line or the like is possible.

A second device 4 for converting the frame-rate is connected to the output of the first device 3. This second device 4 converts the output signal of the first device 3, which, for example, comprises a frame refresh frequency of 50 (60) Hz, into a 100 (120) Hz picture signal. Frame rate conversion can be done, for example, either by repetition of the preceding picture or by motion estimation and picture interpolation. These two methods are known per se from analog television picture processing.

The decoding units 2 and the first and second devices 3, 4 are connected to a common picture storage device 5, thereby enabling a significant saving of components. The output signal of the second device is finally fed to a driver unit 6, to which a display is connected.

Figure 2:
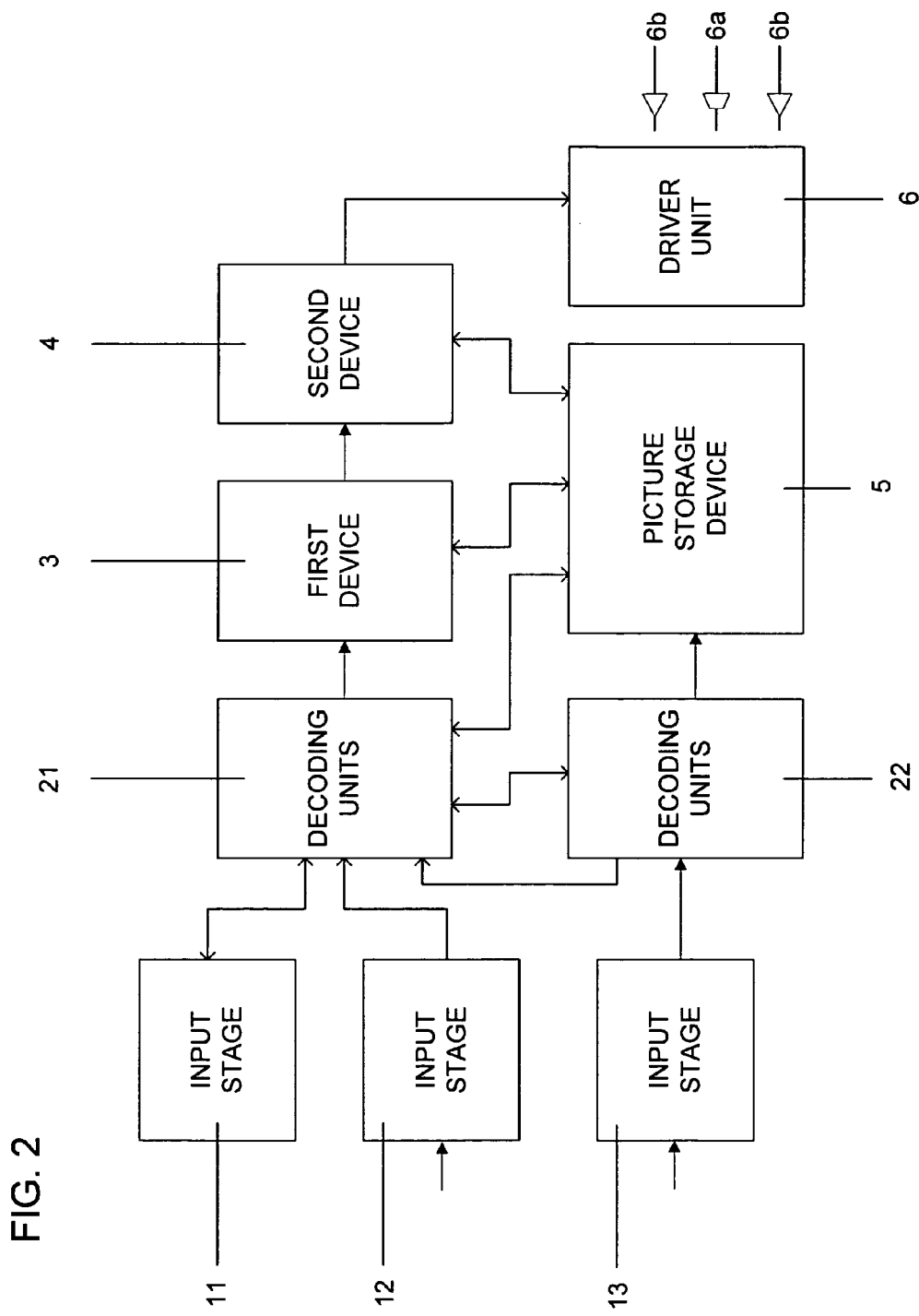
FIG. 2 is a block diagram of the embodiment in accordance with FIG. 1.

FIG. 2 shows the interconnection of the individual blocks in detail. Three input stages 11, 12, 13 are provided, each of which is adapted to a different program source such as CD-ROM, DVD, satellite antenna, cable, etc.

The output signals of these input stages are fed for example as 50 Hz MPEG data streams to the downstream digital decoding units 21, 22, which are also connected to one another.

The decoded picture signals then pass to the first device 3 for acting on the video signal with the abovementioned graphical picture elements and text characters.

Connected to the first device 3 is the second device 4 for frame-rate conversion in the manner described above, whose output signal is fed to the driver unit 6. A display 6a and also loudspeakers 6b are connected to the driver unit.

FIG. 2 also shows the common picture storage device 5, which can be accessed both by the decoding units 21, 22 and by the first and second devices 3, 4.

Beyond merely converting the frame rate, the second device is also capable of freely varying the picture format, using pixel intermediate values stored in the picture storage device, where the pixel intermediate values have been calculated by motion evaluation and pixel interpolation based on preceding pictures.

In particular, in one embodiment, the second device converts the picture scan mode of the incoming video signal from interlaced to progressive scan. Intermediate pictures, calculated by motion evaluation and picture interpolation based on preceding pictures, are retrieved from the picture storage device and reproduced, the intermediate pictures.

While this invention has been particularly shown and described with references to preferred embodiments thereof, it will be understood by those skilled in the art that various changes in form and details may be made therein without departing from the scope of the invention encompassed by the appended claims.

What is claimed is:

1. A signal processing unit for a digital TV system, comprising:
    a first device which acts on a video signal by overlaying graphical picture elements and text characters onto an input video signal to produce a first device output video signal;
    a second device which converts a frame rate of the first device output video signal to produce an increased frame rate video signal;
    a picture storage device accessed by the first and second devices during processing of the video signal and first device output video signal, respectively, for storing and retrieving picture data for the first and second devices; and
    a driver stage which drives a display responsive to the increased frame rate video signal.

2. The signal processing unit of claim 1, wherein the second device increases the frame rate of the first device output video signal by retrieving a preceding picture stored in the picture storage device and reproducing said preceding picture.

3. The signal processing unit of claim 1, wherein the second device varies the frame rate by retrieving an intermediate picture stored in the picture storage device and reproducing said intermediate picture, the intermediate picture calculated by motion evaluation and picture interpolation using preceding pictures.

4. The signal processing unit of claim 1, wherein the second device freely varies the picture format by retrieving pixel intermediate values stored in the picture storage device, and reproducing the pixel intermediate values, the pixel intermediate values calculated by motion evaluation and pixel interpolation based on preceding pictures.

5. The signal processing unit of claim 1, wherein the second device converts a picture scan mode of the incoming video signal from interlaced to progressive scan by retrieving intermediate pictures stored in the picture storage device and reproducing the intermediate pictures, the intermediate pictures calculated by motion evaluation and picture interpolation based on preceding pictures.

6. The signal processing unit of claim 1, further comprising:
    at least one input stage for receiving compressed picture data from at least one transmission medium; and
    at least one decoding unit for converting the picture data into digital pixel data of an overall data stream which is fed to the first device.

7. A method for processing a digital TV system signal, comprising:
    acting on an input video signal by overlaying graphical picture elements and text characters to produce a processed video signal, wherein the first devcice stores and retrieves picture data from a common storage device;
    increasing by a second device the frame rate of the processed video signal to produce an increased frame rate video signal, wherein the second device stores and retrieves picture data from the common storage device; and
    driving a display responsive to the increased frame rate video signal.

8. The method of claim 7, wherein increasing the frame rate of the processed video signal comprises:
    retrieving a stored preceding picture; and
    reproducing said preceding picture.

9. The method of claim 7, wherein the frame rate is varied by retrieving a stored intermediate picture and reproducing said intermediate picture, the intermediate picture calculated by motion evaluation and picture interpolation using preceding pictures.

10. The method of claim 7, wherein picture format is varied by retrieving stored pixel intermediate values, and reproducing the pixel intermediate values, the pixel intermediate values calculated by motion evaluation and pixel interpolation based on preceding pictures.

11. The method of claim 7, wherein a picture scan mode of the input video signal is converted from interlaced to progressive scan by retrieving intermediate pictures stored in the picture storage device and reproducing the intermediate pictures, the intermediate pictures calculated by motion evaluation and picture interpolation based on preceding pictures.

12. The method of claim 7, further comprising:
    receiving, in at least one input stage, compressed picture data from at least one transmission medium; and
    converting, at least one decoding unit, the picture data into digital pixel data of an overall data stream to form the input video signal.

13. A signal processing unit for a digital TV system, comprising:
    (a) a common storage device for storing and retrieving picture data;
    (b) a first device for acting on an input video signal by overlaying graphical picture elements and text characters to produce a processed video signal, wherein the first device stores and retrieves picture data from the common storage device; and
    (c) a second device for increasing a frame rate of the processed video signal, wherein the second device stores and retrieves picture data from the common storage device.

* * * * *